United States Patent Office 3,459,498
Patented Aug. 5, 1969

3,459,498
CONVERSION OF CYANATES TO THIOCYANATES
Gerald A. Johnson, Austin, Tex., assignor to Jefferson Chemical Company, Inc., Houston, Tex., a corporation of Delaware
No Drawing. Filed May 7, 1965, Ser. No. 454,164
Int. Cl. C01c 3/00
U.S. Cl. 23—75          2 Claims

ABSTRACT OF THE DISCLOSURE

Cyanates are converted to thiocyanates by direct reaction with sulfur.

---

This invention is concerned with the conversion of cyanates to thiocyanates. More particularly, this invention is concerned with the conversion of cyanates to thiocyanates by direct reaction with sulfur.

Alkali metal thiocyanates are used as a source of sulfur in reactions wherein the oxygen in organic compounds is replaced by sulfur. In such a reaction, the alkali metal thiocyanate is converted to the corresponding cyanate.

This byproduct alkali metal cyanate has relatively little market value and is best utilized by converting it back to the thiocyanate. In the past, this has been done by reduction of the cyanate with carbon monoxide to the cyanide which then is reacted with sulfur to form the thiocyanate.

I have now discovered that alkali metal cyanates may be converted directly to the corresponding thiocyanates by heating with sulfur at a temperature within the range of from about the fusion point of the sulfur in the mixture to about 500° C.; preferably, 300° to 400° C. The fusion point of sulfur in the mixture will ordinarily be about 100° C. This process thus bypasses some of the steps employed in the prior art.

Sulfur may be employed in my process in any of its forms. A minimum of about 1.5 gram atoms of sulfur per mol of cyanate should be employed. An excess may be used if desired, limited only by the economics.

My process will be further illustrated by the following specific example.

Example I

Sulfur flowers (6.4 grams, 0.2 gram atom) was layered on potassium cyanate (8.1 grams, 0.1 mol) contained in a 2.3 x 20 centimeter test tube in which was inserted a thermocouple. The mixture was heated slowly with a burner until the sulfur melted and ran down over the cyanate. The temperature was then kept at 300° to 350° C. for one-half hour. This mixture was dissolved in water and the sulfide ion was precipitated by the addition of lead diacetate and removed by filtration. Analysis of the filtrate showed a substantial yield of thiocyanate.

Having thus described my invention, I claim:
1. A method for converting an alkali metal cyanate to the corresponding alkali metal thiocyanate which comprises heating the cyanate with at least about 1.5 gram atoms of sulfur per mol of cyanate at a temperature within the range of from about the fusion point of the sulfur in the mixture to about 500° C.
2. A method as in claim 1 wherein the temperature is within the range of about 300° to about 400° C.

References Cited

FOREIGN PATENTS

| | | |
|---|---|---|
| 14,607 | 3/1913 | Great Britain. |
| 492,969 | 9/1938 | Great Britain. |
| 493,116 | 3/1930 | Germany. |
| 243,727 | 3/1963 | Australia. |

OSCAR R. VERTIZ, Primary Examiner

HOKE S. MILLER, Assistant Examiner

U.S. Cl. X.R.
23—79